(12) United States Patent
Velez De Mendizabal Alonso et al.

(10) Patent No.: US 10,899,091 B2
(45) Date of Patent: Jan. 26, 2021

(54) MODULAR MOLD AND METHOD FOR MANUFACTURING A PANEL OF FIBER REINFORCED MATERIAL

(71) Applicant: AIRBUS OPERATIONS S.L., Madrid (ES)

(72) Inventors: Iker Velez De Mendizabal Alonso, Madrid (ES); David Apellaniz De La Fuente, Madrid (ES); Esteban Martino-Gonzalez-Aranjuez, Madrid (ES)

(73) Assignee: AIRBUS OPERATIONS S.L., Madrid (ES)

( * ) Notice: Subject to any disclaimer, the term of this patent is extended or adjusted under 35 U.S.C. 154(b) by 199 days.

(21) Appl. No.: 16/128,935

(22) Filed: Sep. 12, 2018

(65) Prior Publication Data
US 2019/0126572 A1    May 2, 2019

(30) Foreign Application Priority Data
Oct. 31, 2017   (EP) ..................... 17382732

(51) Int. Cl.
*B29C 70/54* (2006.01)
*B29C 33/48* (2006.01)
(Continued)

(52) U.S. Cl.
CPC ............ *B29C 70/54* (2013.01); *B29C 33/485* (2013.01); *B29C 70/30* (2013.01); *B29D 24/004* (2013.01);
(Continued)

(58) Field of Classification Search
CPC ....... B29C 70/54; B29C 33/485; B29C 70/30; B29D 99/0089; B29D 24/004; B29K 2307/04; B29L 2007/002
See application file for complete search history.

(56) References Cited

U.S. PATENT DOCUMENTS

| 9,144,949 B2 * | 9/2015 | Ender ................ B29C 33/485 |
| 2006/0062973 A1 * | 3/2006 | Wilson ................ B29C 70/443 428/188 |

(Continued)

FOREIGN PATENT DOCUMENTS

| EP | 2 008 807 | 12/2008 |
| WO | 03/103933 | 12/2003 |
| WO | 2010/125001 | 11/2010 |

OTHER PUBLICATIONS

Extended Search Report for EP17382732.0, dated May 2, 2018, 5 pages.

*Primary Examiner* — Michael N Orlando
*Assistant Examiner* — Abhishek A Patwardhan
(74) *Attorney, Agent, or Firm* — Nixon & Vanderhye P.C.

(57) ABSTRACT

A modular mold for producing a panel including a panel of fiber reinforced material. The panel is configured to form hollow cells having an undulated trapezoidal cross-section. The mold includes at least three molding bars for forming each hollow cell. One of the molding bars has a trapezoidal cross shape. The other two molding bars have a triangular cross shape. The trapezoidal molding bar is located between the two triangular molding bars. The three molding bars when put together its cross-section forms the shape of the trapezoidal cross-section of the hollow cell.

11 Claims, 8 Drawing Sheets

(51) Int. Cl.
*B29D 99/00* (2010.01)
*B29D 24/00* (2006.01)
*B29C 70/30* (2006.01)
*B29K 307/04* (2006.01)
*B29L 7/00* (2006.01)

(52) U.S. Cl.
CPC ...... *B29D 99/0089* (2013.01); *B29K 2307/04* (2013.01); *B29L 2007/002* (2013.01)

(56) References Cited

U.S. PATENT DOCUMENTS

| | | | |
|---|---|---|---|
| 2012/0233861 A1* | 9/2012 | Tompkins | B29C 70/86 29/897.32 |
| 2012/0234468 A1 | 9/2012 | Pitman et al. | |
| 2015/0328845 A1* | 11/2015 | Lockett | B29D 24/002 428/116 |

* cited by examiner

MODULAR MOLD AND METHOD FOR MANUFACTURING A PANEL OF FIBER REINFORCED MATERIAL

RELATED APPLICATION

This applications claims priority to European Patent Application 17382732-0 filed Oct. 31, 2017, the entirety of which is incorporated by reference.

BACKGROUND OF THE INVENTION

Honeycomb cores are often used in sandwich structures or panels in which the honeycomb core is between external panels or layers. These honeycomb core sandwich panels or structures form a stiff and simultaneously light weight component.

Some of the most relevant advantages of honeycomb core sandwich structures are:

(i) With the same panel stiffness, honeycomb core sandwich structures are lighter than counterpart monolithic structures.

(ii) Substantial fabrication time and money savings for honeycomb core sandwich structures as compared to counterpart monolithic structures.

(iii) Great mechanical properties when compression and traction are loaded on the honeycomb core sandwich structure.

(iv) Great specific stiffness and strength of honeycomb core sandwich structures.

(v) Great torsion stiffness of honeycomb core sandwich structures.

(vi) Acoustic dampening properties and thermal isolation capabilities of honeycomb core sandwich structures.

With honeycomb core sandwich structures the above named benefits are obtained in a cost effective manner.

Honeycomb core sandwich panels can be applied as light weight protective covers or skins on other structural components. The honeycomb core provides structural strength to the cover or skin integrity. Honeycomb cores can be produced in a wide variety of materials, ranging from ballistic materials to metals and their derivatives. Honeycomb cores are usually corrugated configurations not formed by molding. The honeycomb cores are typically formed from metal thin sheets bent into a desired shape.

Composite armors are typically composed of layers of different materials, such as metals, fabrics and ceramics. Although they are lighter than their equivalent full metallic armors, the conventional composite armors tend to add a significant weight to the structures into which they are integrated. This weight penalty is especially critical in aircrafts, where range, speed and/or lift performances can be penalized.

Furthermore, many conventional materials, including conventional honeycomb cores, have positive Poisson ratios which means they get thinner when stretched and fatter when compressed. The Poisson ratio is defined as the negative of the transverse strain divided by the longitudinal strain. The Poisson ratio equation is represented as:

$$v_{yx} = -\frac{\text{transverse strain}}{\text{axial strain}} = -\frac{\varepsilon_x}{\varepsilon_y}$$

There are materials and structures that exhibit a negative Poisson ratio. These materials and structures are auxetic. When stretched, an auxetic material or structure becomes thicker in a direction perpendicular to the applied stretching force, and thinner perpendicular to a compressive force. Applying a unidirectional tensile force to an auxetic material results in an increase in material's dimension(s) transverse, e.g., perpendicular, to the direction of the applied tensile force.

When subjected to an impact, which is similar to a compressive force, auxetic materials and structures concentrate material around the impact area. The concentration of material at the impact area is due to the negative poisson nature of these materials and structures.

The negative Poisson ratio characteristic of auxetic structures is achievable by designing the structure to have a specific geometry of the internal macro structure. For instance, by changing the position of vertical elements on a conventional honeycomb geometry, an auxetic material configuration can be obtained.

SUMMARY OF THE INVENTION

The invention disclosed herein may be embodied as an assembly of triangular and trapezoidal molding bars, and as a method of molding continuous fibers carbon layers into honeycomb cores. The honeycomb cores may be used to form sandwich panels or structures that form relatively thin, stiff and strong external layers or panels.

External panels or layers may be added to the molded (cured) honeycomb cores to form a sandwich structure with the core in the middle. The external panels or layers may be metallic and added after the honeycomb core is cured. Or, the external layers or panels may be sheets (layers) of fiber reinforced material added to the outer surfaces of the layer being molded into a honeycomb structure during the assembly of molding bars around the layers in the molding process.

The molded honeycomb cores may be used in cores of lightweight protection honeycomb core sandwich panels. In particular, the molded honeycomb cores may be formed into panels or ballistic laminates for non-auxetic and auxetic panels. These panels may be applied to shield components underlying the panel against high energy impacts. The molded honeycomb core sandwich panels may be used in airframes and systems.

The use of a mold for manufacturing honeycomb core panels is an enabler for creating alternative geometries cores from continuous fibers carbon laminates and/or ballistic fibers. Further the alternative geometries may be used to form non-auxetic and auxetic core geometries.

The mold may be manufactured in such a way that allows shock absorbing materials to be embedded in the layup of lightweight ballistic fabrics. Ceramic materials or other high compressive strength materials could thus be added to the layup to generate composite armor.

The auxetic panels may be formed of fiber reinforced layers forming hollow cells comprising an undulated trapezoidal cross-section.

The mold may comprise at least three molding bars for forming each hollow cell. One of molding bars has a trapezoidal cross shape. The other two molding bars have a triangular cross shape. The trapezoidal molding bar is to be located in between the two triangular molding bars. The three molding bars when put together have a cross-sectional shape conforming to the desired shape of the trapezoidal cross-section of the hollow cell.

The molding bars may be used for producing both corrugated, such as trapezoidal, as well as hexagonal patterns.

They molding bars may also produce auxetic panels having re-entrant or auxetic geometries. The same molding bars may be used to form the corrugated, hexagonal and re-entrant or auxetic geometries. Thus use of the same molding bars reduced the molding components needed to form the various geometries. The mold bars may also be used to produce honeycomb structures having open cells or closed cells. A closed cell has panel surfaces on all sides of the cell. An open cell has panel surfaces on all but one side which is open to an external layer of the honeycomb core sandwich structure. The mold bars also allow for embedding reinforcement or shock absorbing materials, such as sheets, into the molded component. The molding bars are designed such they can be easily removed from the molded open or closed cells after curing of the panel, e.g., a carbon fiber reinforced composite layer impregnated with a resin.

A re-entrant has a polygon shape that is concave and not convex. A concave polygon will always have at least one reflex interior angle—that is, an angle between 180 degrees and 360 degrees exclusive.

The mold can be manufactured using advanced laser material (ALM) 3D printing techniques or other manufacturing techniques, including conventional techniques to form mold bars. Using an ALM 3D printing technique, the modularity of the invention can be exploited for fast prototyping of different configurations. Which could also lead to cost savings in early development stages, or in low production rates parts.

The mold may comprise a combination of modules which can be configured into capable of achieving corrugated and re-entrant (auxetic) configurations. Exploiting the modularity, open or closed cells can be manufactured. The mold itself is manufactured in several parts. The interchangeability between these parts provides the mold flexibility and modularity for manufacturing different configurations with the same tooling.

The mold has several molding parts to appropriately consolidate the modular geometries and allow a feasible and easy demolding process. The fundamental units of the modular geometries are a trapezoidal shape molding bar and two triangular shaped molding bars. The trapezoidal molding bar may have two different base lengths. Depending on the orientation of the trapezoidal molding bar, a set geometry is created: corrugated if the larger base is over a first face of the panel and reentrant if the larger base is opposite from the first face of the panel. The triangular parts are assembled to the trapezoidal ones. In the case of a corrugated cell shape the trapezoidal and triangular parts can be placed already assembled in the mold, but in the case of re-entrant cells this assembly must be carried out during the molding process, first mounting the triangular parts in the mold per cell, and then assembling the trapezoidal part.

Therefore, the above combination of modules is capable of achieving corrugated and re-entrant (auxetic) configurations and also allows interchangeability between the parts.

The invention may be embodied a method for producing a panel of fiber reinforced material as explained above, comprising the following steps:

(i) providing for a hollow cell open towards a first face of the panel perpendicular to its cross section three molding bars having longitudinal axes parallel to the first face of the panel, one of the molding bars has a trapezoidal cross shape and the other two molding bars having a triangular cross shape. The trapezoidal molding bar is configured to be located between the two triangular molding bars. The assembly of the three molding bars has a cross section conforming to the cross sectional trapezoidal shape of the desired the hollow cell.

(ii) adding a subsequent assembly of triangular and trapezoidal molding bars for each hollow cell open towards the first face of the panel.

(iii) providing a reinforced layer over the assemblies of three molding bars and the area located between two adjacent groups of three molding bars such that an undulated cross-section is formed.

(iv) providing over the reinforced layer located in the area between two adjacent groups of three molding bars, another assembly of three molding bars in which one of the molding bars has a trapezoidal cross shape and other two molding bars have a triangular cross shape. The assembly of the trapezoidal molding bar configured to be located in between the two triangular molding bars. The assembly of the three molding bars has a trapezoidal shape in cross section that conforms to the desired cross sectional shape of the hollow cell open towards a second face of the panel parallel to the first face.

(v) curing the reinforced layer, and (vi) demolding the molding bars.

The molding process may employ Resin Transfer Molding (RTM) or a vacuum bag process to form shielding configurations, such as panels, that can be added to an existing structure or can be part of the structural components of an aircraft. The protection to the underlying components or structures by the shielding configurations such as for structures integrated with aircraft having propulsion engines at the rear of the aircraft, such as Open Rotor or Boundary Layer Ingestion architectures. In such situations protection provisions (shields) are required due to safety concerns against Propeller Blade Release (PBR) and Engine Debris (Uncontained Engine Rotor Failure small fragment and third disc) high energy impacts on the fuselage. The shielding configurations formed with the molding process embodying the invention results in lower weight shielding systems suitable for aircraft components subjection to PRB and Engine Debris and having a lower mass than conventional protection solutions.

SUMMARY OF THE DRAWINGS

To complete the description and in order to provide for a better understanding of the invention, a set of drawings is provided. The drawings form an integral part of the description and illustrate embodiments of the invention. The drawings comprise the following figures.

DETAILED DESCRIPTION OF THE INVENTION

Figure 1:
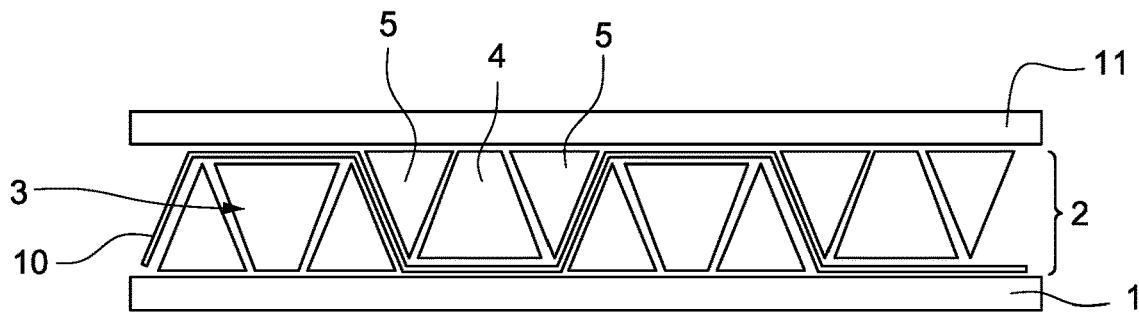
FIG. 1 shows a cross section of a first embodiment of a mold and a honeycomb (corrugated) core fiber reinforced layer in the mold.

FIG. 1 discloses an embodiment of a honeycomb core being molded from a fiber reinforced panel (10), such as a carbon fiber woven or non-woven material. The core is held between a lower mold panel (1), e.g., table, and an upper mold panel (11). After the molding process and after molding bars (4, 5) are removed, the cured fiber reinforced panel (10) may be sandwiched between external layers which are positioned where the mold panels (1, 11) were positioned. The external layers may be made of a homogeneous material, for instance, a metallic material.

The honeycomb core is made of a fiber reinforced panel (10) molded to form hollow cells (3). Each cell (3) comprises has a trapezoidal shape in cross-section. Each cell (3) is an open cell in that a side of the cell is open to and formed by one of the external layers (represented by mold panels 1, 11). The hollow cells extend the length of the core fiber reinforced panel (10), wherein each cell extends along a straight line axes parallel to the other cells in the panel (10). An open hollow cell (3, 8) has one side that is adjacent one of the layers, e.g., panels, (1, 11). A closed hollow cell (9, 10) is covered on all sides by a layer(s) (10) of fiber reinforced materials.

The mold assembly for each of the cells (3) comprises three molding bars (4, 5). Each of the molding bars is straight along a longitudinal axis of the cell and may extend from a front edge to a rear edge of the mold panel (1, 11). One of the molding bars (4) has a trapezoidal shape in cross section. The other two molding bars (5) have a triangular shape in cross section. The trapezoidal molding bar (4) is located between the two triangular bars (5). The three molding bars (4, 5) when assembled form an assembly that has a trapezoidal shape in cross section which conforms to the cross section of the hollow cell (3). The assemblies of two triangular bars (5) and one trapezoidal bar (4) are arranged side by side, such that each assembly of bars (5, 4) is inverted as compared to an adjacent assembly. The assemblies each have a longitudinal axis extending perpendicular to the plane of FIG. 1.

Figure 5:
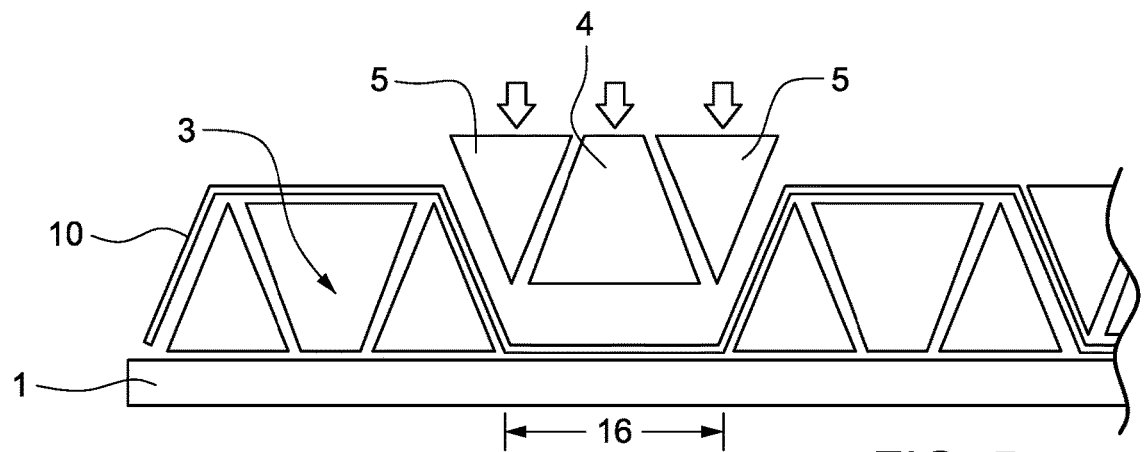
FIG. 5 shows the method of manufacturing a core fiber reinforced layer according to FIG. 1.

The hollow cells (3) shown in FIG. 1 are formed by assembling the molding bars such that the bases of the two triangular bars (5) and the narrow base of the trapezoidal bar (4) face mold panel (1, 11) and the other surfaces of the assembly of molding bars are covered by the fiber reinforced panel (10). This arrangement of the fiber reinforced panel (10) and assembly of mold bars (4, 5) results in open hollow cells (3) having a wide opening of the cell which is wider than the closed opposite side of the cell. FIG. 5 shows an example for assembling the trapezoidal bar (4) and two triangular bars (5) are assembled for a hollow cell (3) shown in FIG. 1.

Figure 2:
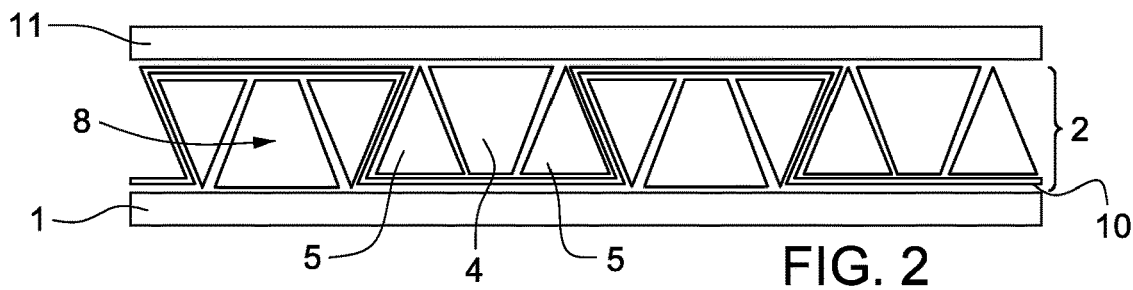
FIG. 2 shows a cross section of a second embodiment of the mold and a re-entrant core fiber reinforced layer in the mold.

FIG. 2 discloses another embodiment in which a fiber reinforced panel (10) is molded into open hollow cell (8) that have a narrow open side of the cell as compared to a wide closed opposite side of the cell. The open hollow cell (8) forms a reentrant shape and the resulting molded fiber reinforced panel (10) that can a cured auxetic core between external layers.

Figure 6:
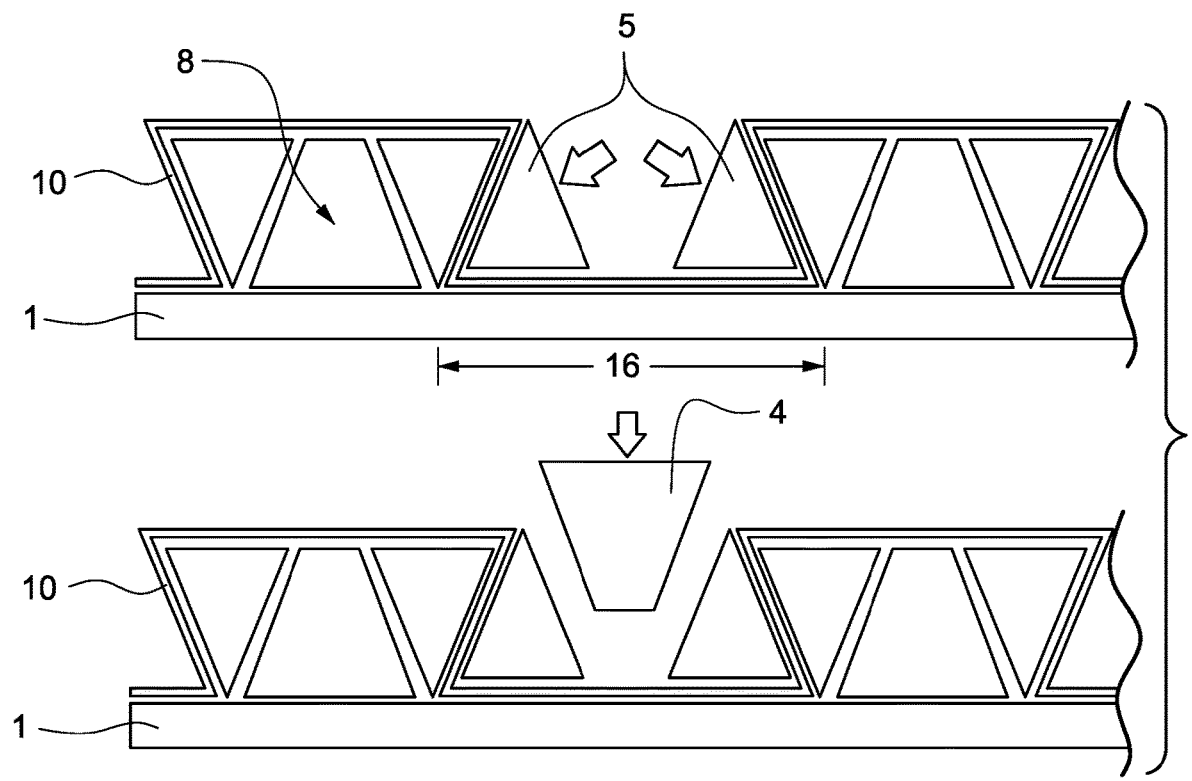
FIG. 6 shows the method of manufacturing a core fiber reinforced layer according to FIG. 2.
Figure 7:
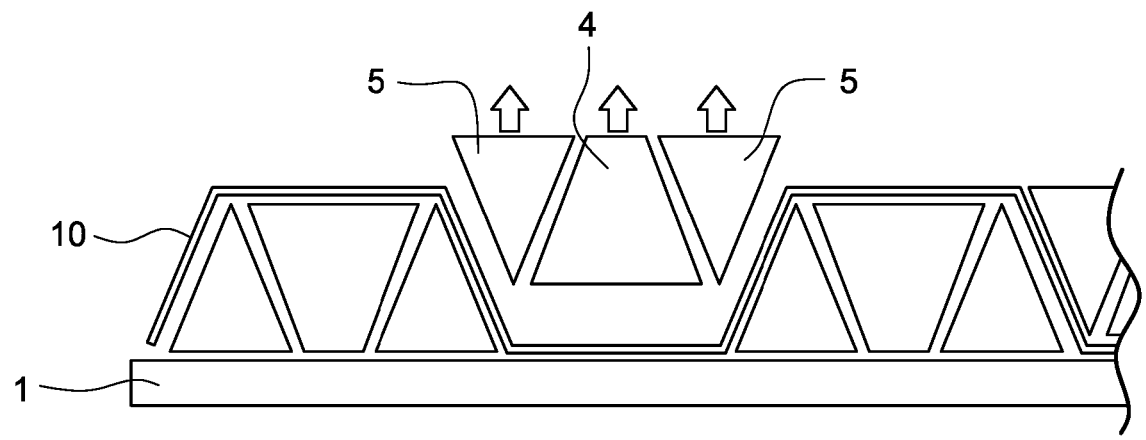
FIG. 7 shows the method of demolding the mold according to FIG. 1.

In FIG. 2, each of the hollow cells (8) is formed by positioning the wide base of the trapezoidal bar (4) to face a panel (1, 11), and the tips (apexes) of the triangular bars (5) to face the same panel. A difference between FIG. 2 and FIG. 1 is that the narrow base of the triangular bar (4) faces the fiber reinforced panel (10) in FIG. 2 and the wide based of the triangular bar (4) faces the fiber reinforced panel (10) in FIG. 1. In FIG. 2, the fiber reinforced panel (10) is arranged such that it faces the narrow base of the trapezoidal bar (4) and the bases of both the triangular bars (5). The fiber reinforced panel (10) is sandwiched between sides of adjacent triangular bars (5) in both FIGS. 1 and 2. FIG. 6 depicts the molding process for open cells (8) shown in FIG. 2.

Figure 3:
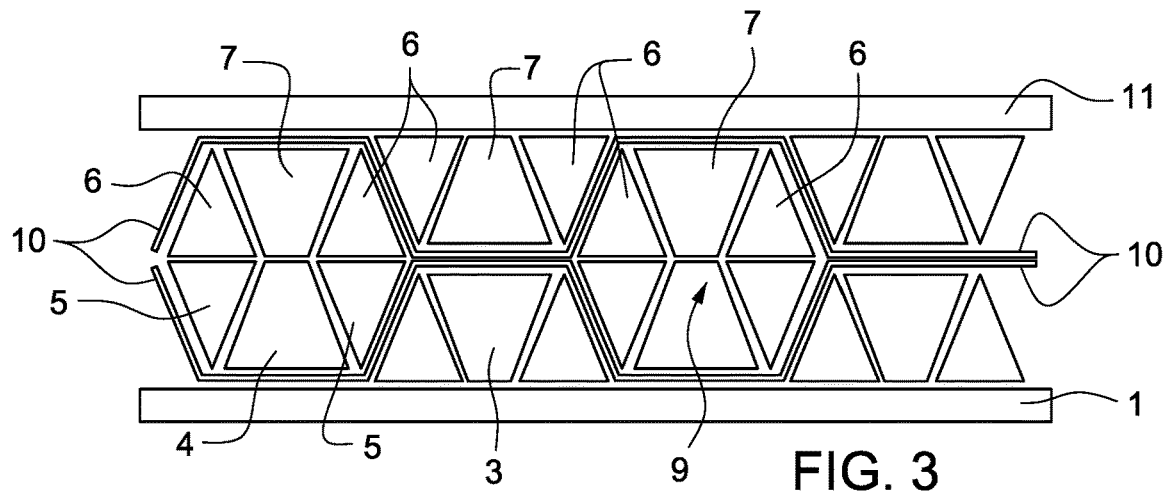
FIG. 3 shows a cross section of a third embodiment of the mold and a core fiber reinforced layer having a hexagonal hollow cell.
Figure 4:
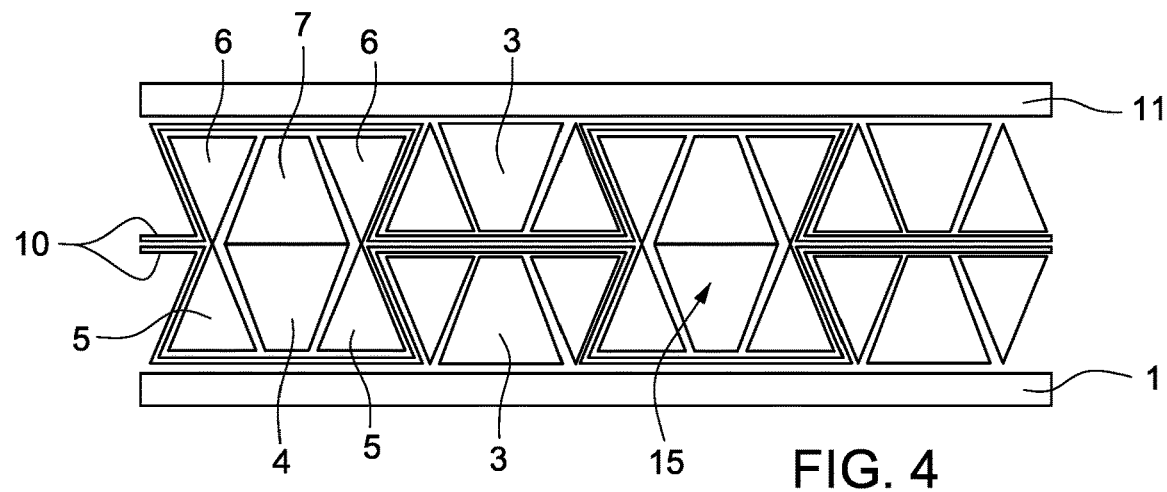
FIG. 4 shows a cross section of a fourth embodiment of the mold and an auxetic core fiber reinforced layer having a reentrant hexagonal hollow cell.

FIGS. 3 and 4 show closed hollow cells (9, 10) formed by stacked rows of triangular (5, 6) and trapezoidal (4, 7) molding bars with the previously described configuration. The molding bars (3, 4, 5, 6) in FIGS. 1 to 4 are arranged to be parallel to a longitudinal axis of the core (2) and parallel to the interior surfaces of the layers (1, 11).

Pairs of open cells (3, 4) described in connection with FIGS. 1 and 2 may be combined to form a closed cell (9, 10) as shown in FIGS. 3 and 4. The molding process of a closed cell is similar to that for an open cell (3, 4) configuration. To form a closed cell a pair of assemblies of molding bars (4, 5 and 6, 7) are stacked one on top of the other. The molding process is replicable for as many cells as needed.

Specifically the assemblies of molding bars used to form a closed hollow cell (9, 10) includes two triangular bars (5) which sandwich a trapezoidal bar (4), and a second assembly of two triangular bars (6) and one trapezoidal bar (7). The two assemblies are stacked one on the other. The stacked pair of assemblies may form in cross section a hexagonal shape as shown as (9) in FIG. 3. Alternatively, the stacked pair of assemblies may form another polygon shape, such as (15) shown in FIG. 4. The hollow cells (9, 15) having an upper surface adjacent and parallel to the interior face of the upper panel (11) and the lower surface of the cell (i) is adjacent and parallel to the interior face of the lower panel (1).

Between each of the stacked assemblies forming a closed hollow cell (9, 15) are a pair of three molding bars (4, 5 and 6, 7) which each form a hollow cell (3) similar to those shown in FIG. 1. Two fiber reinforced layers (10) are arranged such that the layers cover entirely the outer surfaces of the stacked assemblies defining the hexagonal closed hollow cell (9). The two fiber reinforced layers (10) cover a portion of the outer surfaces of the hollow cells (3) but do not cover surfaces of the hollow cells (3) that face and are adjacent one of the layers (1, 11).

The pairs of assemblies of molding bars (4, 5, 6, 7) may be arranged to form an hexagonal hollow cell (3) or a reentrant polygon hollow cell (3) depending on how the trapezoidal molding bars (4, 7) are assembled.

FIG. 5 illustrates a method for forming the honeycomb core panel shown in FIG. 1. FIG. 6 illustrates a method for forming the honeycomb core panel shown in FIG. 2. Both methods include the following steps:

(i) providing the first external panel (1), (ii) providing on the first external panel (1), an assembly of three molding bars (4, 5) for each open hollow cell (3) which is to open towards the first external panel (1). The assembly includes a trapezoidal molding bar (4) sandwiched between a pair of triangular molding bars (5). The molding bars are arranged such that their longitudinal axes are parallel to each other and to the surface of the panel (1). Also, the axes are perpendicular to the plane shown in FIGS. 5 and 6. A gap (16) on the panel (1) is left between the assemblies for another assembly of three molding bars.

(iii) providing a layer(s) (10) of fibers reinforced layers (s), such as carbon fiber composite layers, over the assemblies of molding bars (4, 5) arranged on the first external panel (1). The fiber reinforced layer(s) (10) conforms to the exposed outer surfaces of the assemblies of molding bars (4, 5) and to the exposed surface of the first external panel (1) at gap (16).

(iv) providing over the reinforced core panel (10) and in the gap 16 between assemblies of molding bars (4, 5), additional assemblies of three molding bars (4, 5) each having a trapezoidal molding bar (3) sandwiched between a pair of triangular molding bars (4). Each of the assemblies of molding bars has a shape in cross section similar to a trapezoidal shape of the open hollow cell (3) to be formed from the fiber reinforced layer(s) (10). The additional assemblies positioned on the panel (10) as shown in FIGS. 4 and 5 are each to be open to and face an inner surface of the second external panel (11), (v) providing the second external panel (11) over the fiber reinforced panel (10) and the molding bars (4, 5) (see FIGS. 1 and 2), (vi) curing the fiber reinforced panel (10) while conforming to the outer shapes of the assemblies of molding and the inner surfaces of the first and second external layers (1, 11), and (vii) demolding the molding bars (4, 5) by removing the bars from the cured fiber reinforced layer.

Figure 8:
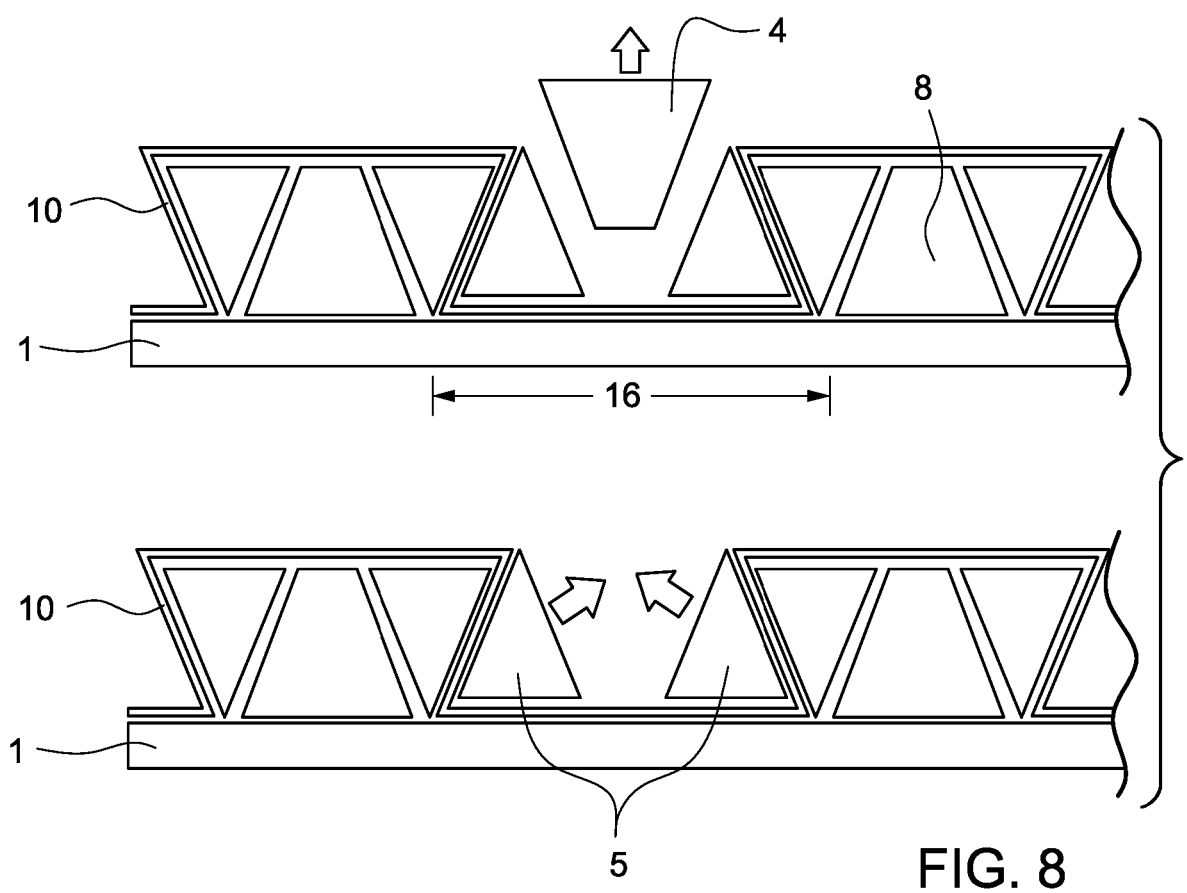
FIG. 8 shows the method of demolding the mold according to FIG. 2.

For the demolding process of the open hollow cells (3), in the case of the re-entrant shapes, as shown in FIG. 8, the demolding must be carried out opposite to the molding. The trapezoidal molding bar (4) has to be extracted first, as this is the molding bar that holds both triangular molding bars (5) in place. Right after the trapezoidal shape (4) has been removed the triangular shapes (5) can be extracted. In the case of corrugated shapes, the trapezoidal (4) and triangular (6) bars can be demolded at the same time.

Figure 11:
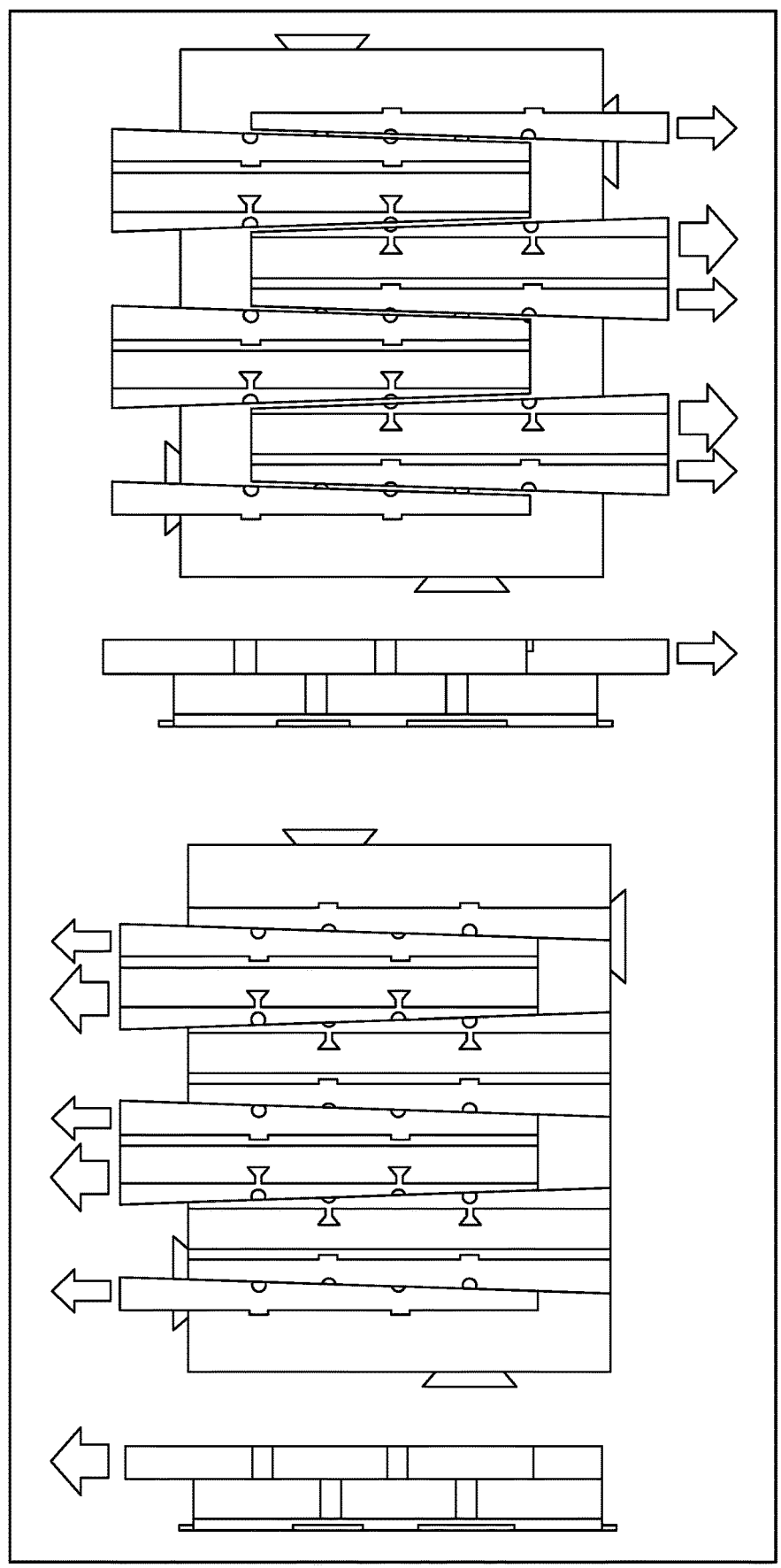
FIG. 11 shows the demolding steps of the embodiment of FIGS. 9A, 9B and 9C.
Figure 12:
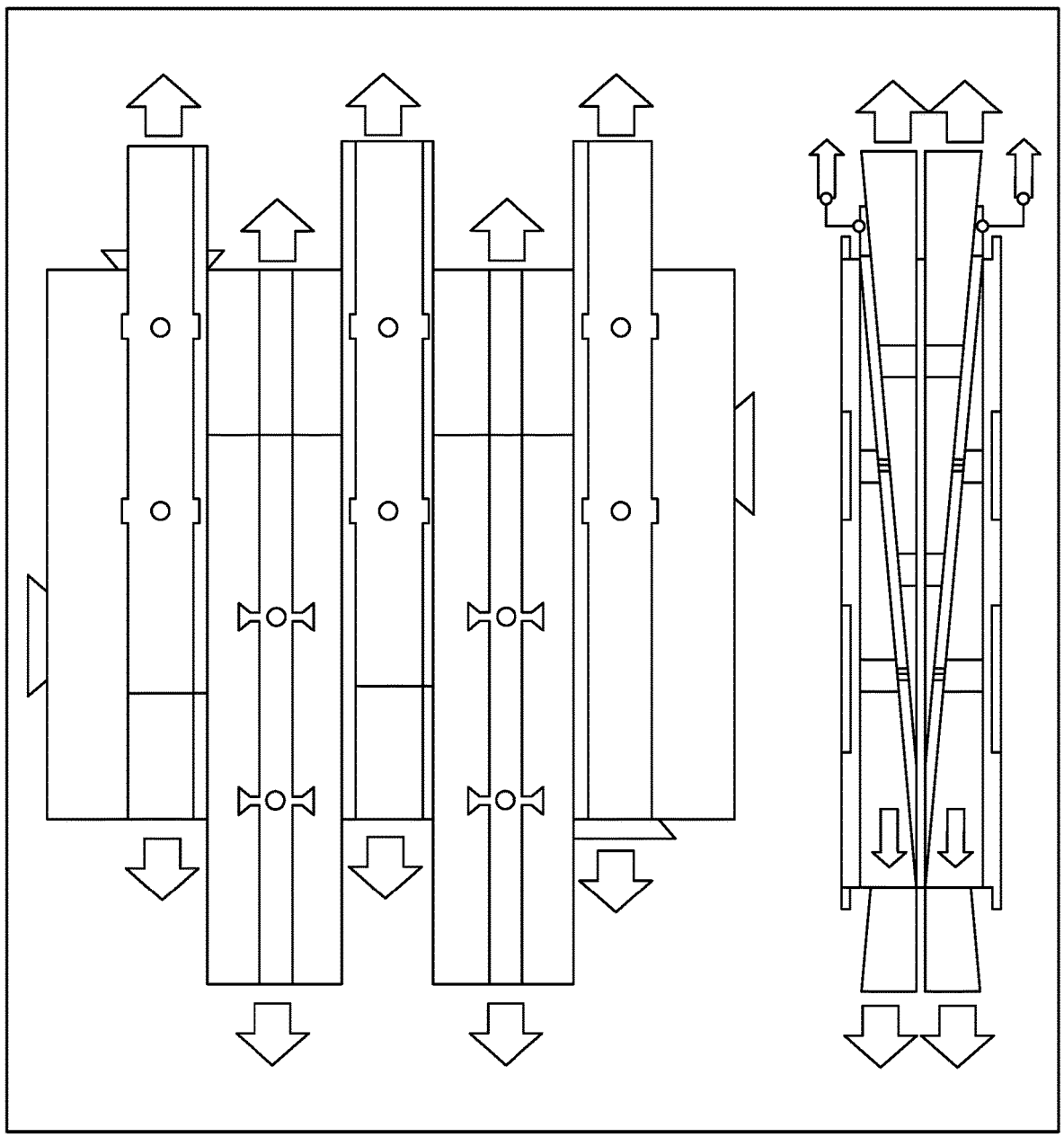
FIG. 12 shows the demolding steps of the embodiment of FIGS. 10A, 10B and 10C.

For the closed hollow cells (3) configuration, the demolding is performed by removing the bars from the cells (3) along the longitudinal direction. In order to do so, two different concepts have been devised and are shown in FIGS. 9A, 9B and 9C, and in FIGS. 10A, 10B and 10C, as well as FIGS. 11 and 12.

Figure 9A:
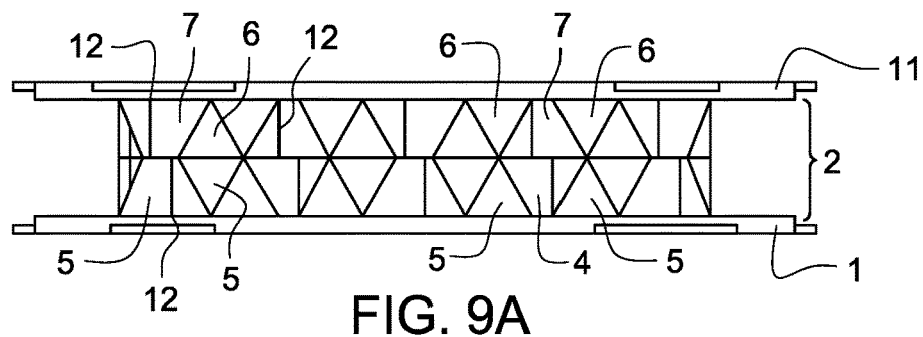
FIGS. 9A, 9B and 9C illustrate front view (9A), side view (9B) and bottom view with a mold panel removed (9C) a first embodiment of a closed cell demolding configuration.
Figure 9B:
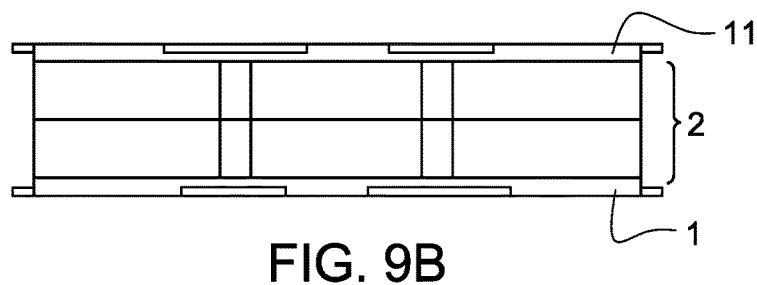
Figure 9C:
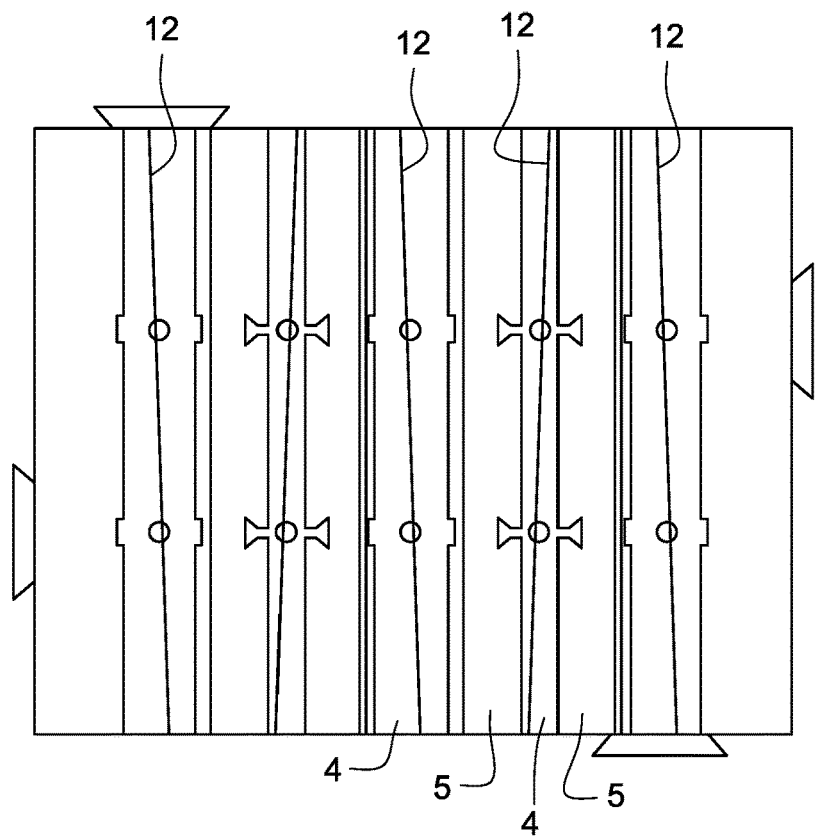

FIGS. 9A, 9B and 9C show a first demolding process in which the triangular molding bars (5, 6) are kept unaltered. However, the trapezoidal molding bars (4, 7) are split into two parts along a slope plan (12) perpendicular to the bases of the trapezoidal bars (4, 7) and forming an angle with the longitudinal axis of the molding bar (4, 7). The split in the trapezoidal bar (4, 7) aids in removing the bar from the hollow cell.

The demolding sequences of a closed cell differ from the one performed in the open cell (3). With an open cell, some or all of the molding bars may be lifted from the cured in a direction out of the plane of the exterior panel (1). The out of plane direction of extraction is not an option with the closed cells. Consequently, molding bars (4, 5, 6, 7) have to be extracted axially from the open lateral sides of the molds, as it can be seen in FIG. 11.

More specifically, each triangular part (5, 6) is joined to a split of the trapezoidal part (4, 7), those parts forming a unit. These units are extracted in their predefined demolding directions by means of the vertical sloped splitting plane (12) perpendicular to the bases of the trapezoidal molding bar (4, 7) and forming an angle with the longitudinal direction of the trapezoidal molding bar (4, 7). Ones in a first step in one of the longitudinal directions of the cells (3), and the remaining ones in a second step in the opposite longitudinal direction of the cells (3). This is shown schematically in FIG. 11.

Figure 10A:
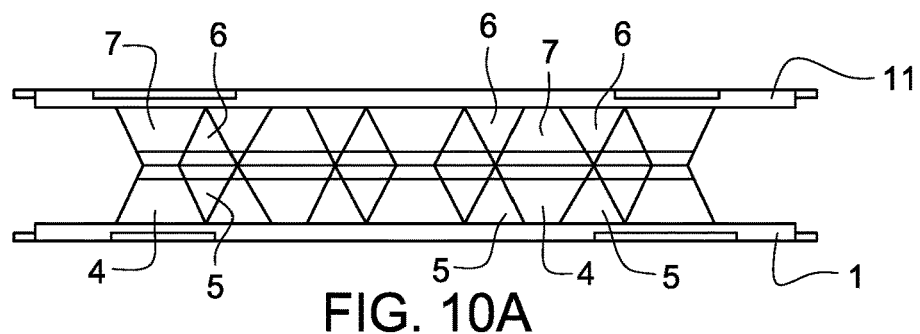
FIGS. 10A, 10B and 10C illustrate front view (10A), side view (10B) and bottom view with mold panel removed (10C) of a second embodiment of a closed cell demolding configuration.
Figure 10B:
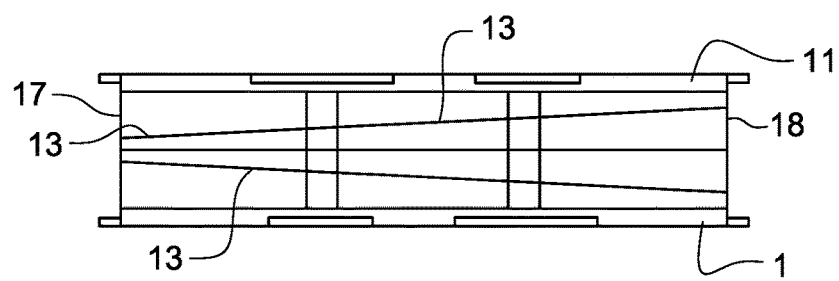
Figure 10C:
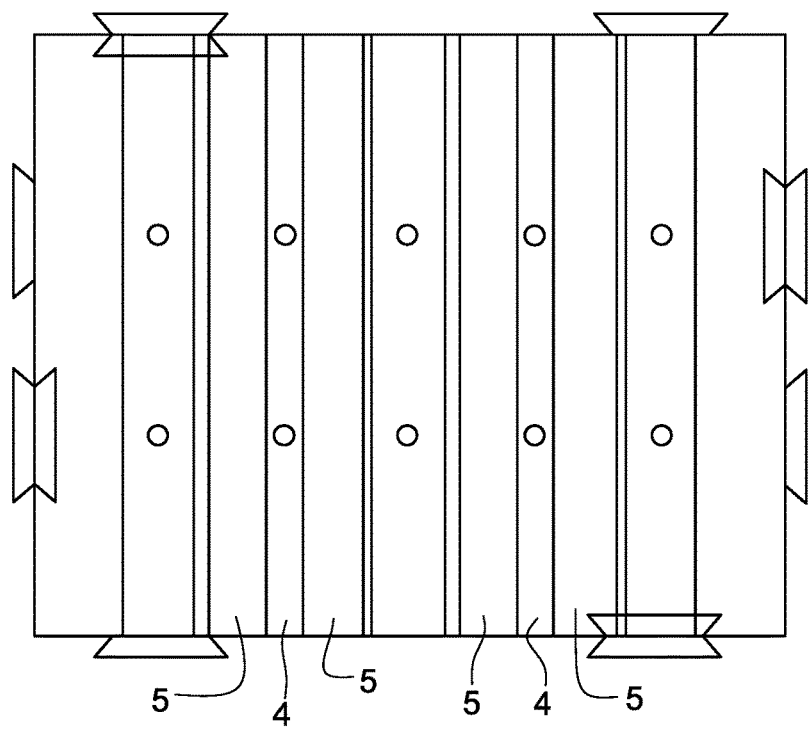

FIGS. 10A, 10B and 10C show a second process for the demolding process in which both the trapezoidal cross shape molding bars (4, 7) and the triangular molding bars (5, 6) are split into two parts by a slope plane (13) perpendicular to a plane perpendicular to the bases of the trapezoidal and triangular bars (4, 5, 6, 7) in the longitudinal direction and that forms an angle with the longitudinal direction of the molding bars (4, 5, 6, 7). The sloped plane (13) is placed horizontal instead of vertical, and in order to ease the demolding it must cut all the adjacent parts per cell, trapezoidal and triangular (4, 5, 6, 7), thus achieving less commonality than the first embodiment. In this case the molding bars (4, 5, 6, 7) can be joined in groups of three by means of a joint so that more parts can be demolded at the same time.

The demolding process is similar to the first embodiment. The parts must also be demolded in their predefined by means of the horizontal sloped splitting plane (13) demolding directions. This process is detailed in FIG. 12. In a first step the inner cells (3) parts are extracted in alternative longitudinal directions of the cells (3), and in a second step the remaining ones are extracted in the opposite alternative longitudinal direction of the cells (3).

Figure 13A:
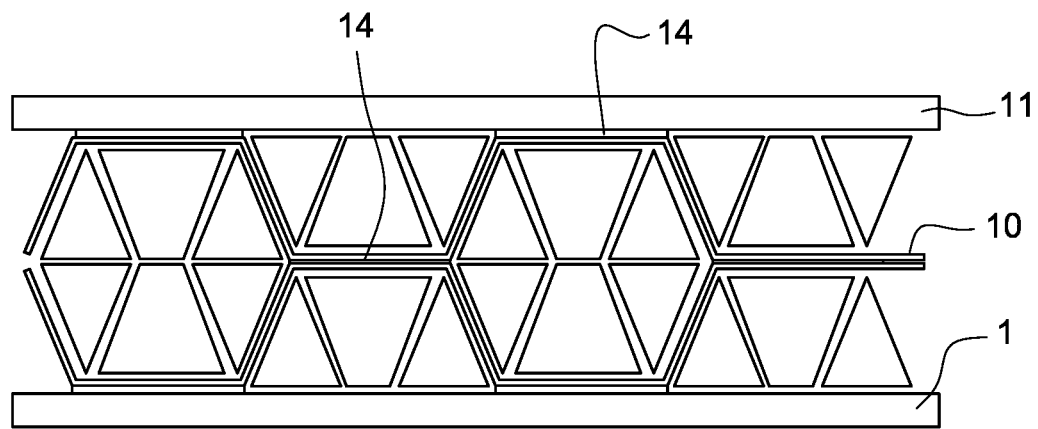
FIGS. 13A and 13B show a sandwich panel with embedded alternative materials for potential high energy impacts absorption.
Figure 13B:
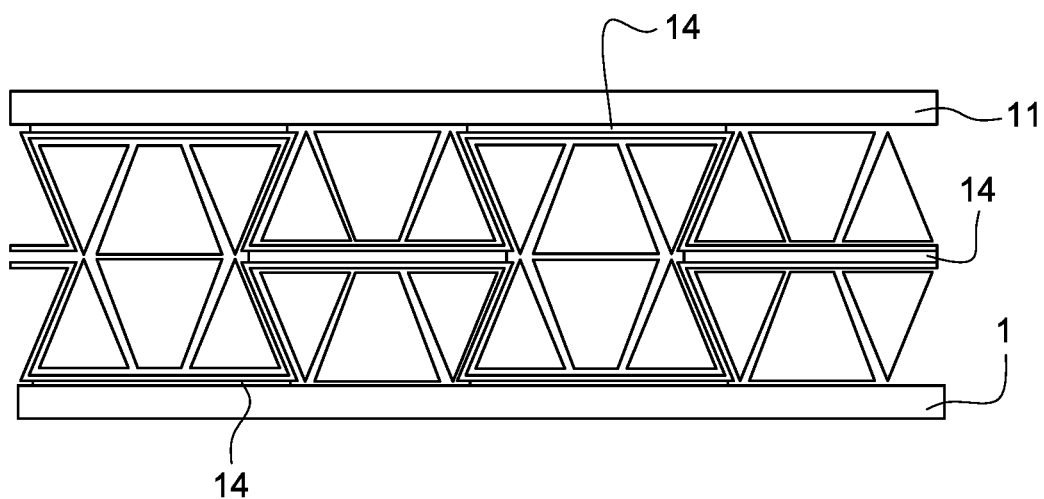

The mold and the process also give the opportunity to embed different types of materials as can be seen in FIGS. 13A and 13B, in which a sheet of material (14) is located between the external layers (1, 11) and the core panel (10) at the head of the hollow cells (3) and a sheet of material (14) is also provided between two fiber reinforced layers (10) of adjacent cells (3) or even between the molding bars (4,5) and the reinforced panel (10). This opportunity is especially interesting for high energy prone impact cells faces. Those materials range from high compressive strength materials to shock absorption polymers. Some examples of these embeddable materials could be: ceramics, elastomers, metals.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A method for manufacturing a panel comprising a layer of fiber reinforced material, wherein the layer forms hollow cells, the method comprising:
   to form each of the hollow cells open towards a first panel, arranging a first assembly of three molding bars each having a longitudinal axis parallel to the first panel, wherein (i) a trapezoidal molding bar of the three molding bars has a trapezoidal shape in cross section, and two triangular molding bars each have a triangular shape in cross section, (ii) the trapezoidal molding bar is positioned between the two triangular molding bars such that side surfaces of the trapezoidal molding bar each face a first side surface of one of the triangular molding bars, (iii) each of the first assemblies has exposed surfaces including a second side surface of the triangular molding bars and a base of the trapezoidal bolding bar, and (iv) each of the first assemblies has a trapezoidal shape in cross section;
   leaving a gap between adjacent ones of the first assemblies arranged on the first panel;
   applying a first layer of fiber reinforced material to the first assemblies and to the first panel such that the first layer conforms to the exposed surfaces of each of the first assemblies and to a surface of the first panel at each of the gaps, wherein the applying of the first layer does not separate the trapezoidal molding bar in each of the first assemblies from the two triangular molding bars in the first assembly;
   positioning on the first layer in each of the gaps, a second assembly of three molding bars including a pair of triangular molding bars and a trapezoidal molding bar between the pair of triangular molding bars to form a hollow cell open towards a direction opposite to the first panel, wherein each of the second assemblies have a trapezoidal shape in cross section;
   positioning a second panel to cover the first layer of fiber reinforced material, the first assemblies and the second assemblies;
   curing the first layer of fiber reinforced material while the first layer and the first and second assemblies are positioned between the first and second panels, and
   demolding the molding bars from the cured first layer of fiber reinforced material.

2. The method of claim 1, wherein each of the first assemblies is arranged by positioning a narrow base of the trapezoidal bar and bases of each of the two triangular bars to face the first panel.

3. The method of claim 2, wherein each of the second assemblies is arranged by positioning a wide base of the trapezoidal bar and the apexes of each of the two triangular bars on the layer in one of the gaps.

4. The method of claim 1, further comprising applying external layers on the cured first layer to form a honeycomb core sandwiched panel.

5. The method of claim 1 further comprising applying a sheet of material over at least a portion of the first layer of the reinforced material before the second panel is positioned over the first layer.

6. The method of claim 1 further comprising:
   positioning on each of the second assemblies a third assembly of two triangular bars and a trapezoidal bar between the two triangular bars such that the two triangular bars are aligned with the two triangular bars of a corresponding second assembly and the trapezoidal bar of the third assembly is aligned with the trapezoidal bar of the second assembly, and
   applying a second layer of fiber reinforced material over the third assemblies and the first layer, such that the second layer conforms to exposed surfaces of the third assemblies and the first layer,
   wherein the positioning of the second panel includes covering the second layer and the third assemblies with the second panel.

7. The method of claim 6 wherein apexes of each of the two triangular bars of the third assembly are aligned with apexes of the two triangular bars of the second assemblies along a direction perpendicular to the first panel, and
   a narrow bases of the trapezoidal bar in each of the third assemblies is aligned with a narrow base of the trapezoidal bar in a corresponding one of the second assemblies.

8. The method of claim 6 further comprising positioning on the second layer of fiber reinforced material fourth assemblies each aligned with one of the first assemblies along a direction perpendicular to the first panel, wherein the fourth assembly includes two triangular bars and a trapezoidal bar between the two triangular bars such that the two triangular bars each have a base facing the second panel and the trapezoidal bar has a wide base facing the second panel.

9. The method of claim 6, further comprising providing a sheet of material between the first and second layers of reinforced material.

10. The method of claim 1, further comprising providing a first external layer over the cured first layer to cover open cells in the cured first layer formed by the first assemblies.

11. The method of claim 10 wherein a second external layer is applied to a side of the cured first layer opposite to first external layer.

* * * * *